US005948524A

United States Patent [19]

Seethamraju et al.

[11] Patent Number: 5,948,524
[45] Date of Patent: *Sep. 7, 1999

[54] ADVANCED ENGINEERING RESIN AND WOOD FIBER COMPOSITE

[75] Inventors: Kasyap V. Seethamraju, St. Paul, Minn.; Michael J. Deaner, Osceola, Wis.

[73] Assignee: Andersen Corporation, Bayport, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/585,320

[22] Filed: Jan. 8, 1996

[51] Int. Cl.⁶ ............................... B32B 5/16; D02G 3/00
[52] U.S. Cl. ........................ 428/326; 428/359; 428/361; 428/378; 428/393; 428/425.1; 428/479.3; 428/479.6; 428/507
[58] Field of Search ..................................... 428/402, 407, 428/323, 373, 375, 361, 393, 326, 507, 510, 511; 521/13, 14, 16, 34, 551, 567, 908; 523/222

[56] References Cited

U.S. PATENT DOCUMENTS

| | | |
|---|---|---|
| 2,188,396 | 1/1940 | Semon . |
| 2,489,373 | 11/1949 | Gilman . |
| 2,519,442 | 8/1950 | Delorme et al. . |

(List continued on next page.)

FOREIGN PATENT DOCUMENTS

| | | |
|---|---|---|
| 62 533 | 10/1982 | European Pat. Off. . |
| 62 533 | 11/1982 | European Pat. Off. . |
| 0 540 026 | 5/1993 | European Pat. Off. . |
| 93 30 6843 | 11/1993 | European Pat. Off. . |
| 93 30 6845 | 11/1993 | European Pat. Off. . |
| 0 586 212 | 3/1994 | European Pat. Off. . |
| 0 610 619 | 8/1994 | European Pat. Off. . |
| 0 747 419 | 12/1996 | European Pat. Off. . |
| 2200112 | 4/1974 | France . |
| 2270311 | 12/1975 | France . |
| 2344101 | 10/1977 | France . |
| 2365019 | 4/1978 | France . |
| 2445885 | 9/1980 | France . |
| 2564374 | 11/1985 | France . |
| 20 42 176 | 4/1971 | Germany . |
| 24 27 080 | 11/1975 | Germany . |
| 2 036 148 | 6/1980 | United Kingdom . |
| 2 104 903 | 3/1983 | United Kingdom . |
| 2 171 953 | 9/1986 | United Kingdom . |
| 2 186 655 | 8/1987 | United Kingdom . |
| WO 90/08020 | 7/1990 | WIPO . |
| WO 92/07022 | 4/1992 | WIPO . |

OTHER PUBLICATIONS

Patent Abstracts of Japan, vol. 007, No. 203 (M–241), Sep. 8, 1983 & JP 58 102745 A (Takashi Honda), Jun. 18, 1983, see abstract.
Patent Abstracts of Japan, vol. 095, No. 009, Oct. 31, 1995 & JP 07 164443 A (Nanba Press Kogko KK), Jun. 27, 1995, see abstract.
Patent Abstracts of Japan, vol. 010, No. 166 (C)353), Jun. 13, 1986 & JP 61 016965 A (Karupu Kogyo KK), Jan. 24, 1986, see abstract.
"A Complete Guide to Anderson Windows & Patio Doors", 1992 Product Catalog.
Advanced Environmental Recycling Technologies, Inc., Recycling Solutions for the 90's, AERT Moistureshield Industrial OEM Price List, Effective Jul. 15, 1991 – Oct. 15, 1991.
"ASTM Designation: D 724 – 89: Standard test method for surface wettability of paper (Angle–of–contact method)", *Annual Book of ASTM Standards,* vol. 15.09, pp. 60–62 (Jul. 1989).
BFGoodrich, Geon Vinyl Division, Section One, FIBER-LOC®, Polymer Composites, Engineering Design Data Sheet, pp. 2–15 (date unknown).
Bendtsen, B. A. (rev.), "Mechanical Properties of Wood", pp. 4–2 through 4–44 (source and date unknown).
"Byggkatalogen Svensk Byggkatalog 91/92 (Swedish Builders Catalog, 91/92)", 6 pages, with 1–page English translation.
"Cincinnati compounds wood", *Communique,* 12(3), Winter 1996; 3 pages.
"Correlation of Molecular Weight Expressions for Geon PVC Resins", ©1994, The Geon Company; 1 page (Jun. 1994).

(List continued on next page.)

*Primary Examiner*—Marion E. McCamish
*Assistant Examiner*—J. M. Gray
*Attorney, Agent, or Firm*—Merchant & Gould P.C.

[57] ABSTRACT

The invention relates to a composition including an engineering resin and wood fiber composite that can be used in the form of a linear extrudate or thermoplastic pellet used to manufacture structural members. The resin/wood fiber composite structural members can be manufactured in an extrusion process or an injection molding process as a linear extrudate or pellet that can have a cross-section of any arbitrary shape, or can be a regular geometric shape and have a volume of at least about 12 mm³. Preferably the pellet is a right cylindrical pellet having a minimum radius of about 1.5 mm and a minimum length of 1 mm weighing at least 14 mg. The invention also relates to the environmentally sensitive recycle of waste streams. The resin/wood fiber composite can contain an intentional recycle of a waste stream including polymer flakes, polymer particles, or wood fiber as well as adhesives, paint, or preservatives. The initial mixing step before extrusion of the composite material insures substantial mixing and melt contact between molten resin and wood fiber. The extruded pellet includes a useful proportion of resin, wood fiber and water. During the extrusion, water is removed intentionally to dry the material to a maximum water content of less than about 10 wt % based on the pellet weight. The pellet is then introduced into an extruder or injection molding apparatus wherein the composite pellet material is shaped into a useful cross-section.

51 Claims, No Drawings

U.S. PATENT DOCUMENTS

| | | |
|---|---|---|
| 2,558,378 | 6/1951 | Petry . |
| 2,635,976 | 4/1953 | Meiler et al. . |
| 2,680,102 | 6/1954 | Becher . |
| 2,789,903 | 4/1957 | Lukman et al. . |
| 2,926,729 | 3/1960 | Zanini . |
| 2,935,763 | 5/1960 | Newman et al. . |
| 3,147,518 | 9/1964 | Horgan, Jr. . |
| 3,287,480 | 11/1966 | Wechsler et al. . |
| 3,308,218 | 3/1967 | Wiegand et al. . |
| 3,309,444 | 3/1967 | Schueler . |
| 3,349,538 | 10/1967 | Crossman . |
| 3,432,885 | 3/1969 | Zanini . |
| 3,492,388 | 1/1970 | Ingli-Knuüsel . |
| 3,493,527 | 2/1970 | Schuler . |
| 3,562,373 | 2/1971 | Logrippo . |
| 3,645,939 | 2/1972 | Gaylord . |
| 3,671,615 | 6/1972 | Price . |
| 3,833,325 | 9/1974 | Ramsey . |
| 3,844,091 | 10/1974 | Vedvik et al. . |
| 3,878,147 | 4/1975 | Baumann et al. . |
| 3,888,810 | 6/1975 | Shinomura . |
| 3,899,559 | 8/1975 | Johnanson et al. . |
| 3,904,726 | 9/1975 | Jacquelin et al. . |
| 3,931,384 | 1/1976 | Forquer et al. . |
| 3,943,079 | 3/1976 | Hamed . |
| 3,956,541 | 5/1976 | Pringle . |
| 3,956,555 | 5/1976 | McKean . |
| 3,969,459 | 7/1976 | Fremont et al. . |
| 4,005,162 | 1/1977 | Bucking . |
| 4,012,348 | 3/1977 | Chelland et al. . |
| 4,016,232 | 4/1977 | Pringle . |
| 4,018,722 | 4/1977 | Baker . |
| 4,033,913 | 7/1977 | Sundén . |
| 4,045,603 | 8/1977 | Smith . |
| 4,056,591 | 11/1977 | Goettler et al. . |
| 4,058,580 | 11/1977 | Flanders . |
| 4,071,479 | 1/1978 | Broyde et al. . |
| 4,097,648 | 6/1978 | Pringle . |
| 4,102,106 | 7/1978 | Golder et al. . |
| 4,115,497 | 9/1978 | Halmø et al. . |
| 4,145,389 | 3/1979 | Smith . |
| 4,168,251 | 9/1979 | Schinzel et al. . |
| 4,181,764 | 1/1980 | Totten . |
| 4,187,352 | 2/1980 | Klobbie . |
| 4,202,804 | 5/1980 | Porzel et al. . |
| 4,203,876 | 5/1980 | Dereppe et al. . |
| 4,228,116 | 10/1980 | Colombo et al. . |
| 4,239,679 | 12/1980 | Rolls et al. . |
| 4,244,903 | 1/1981 | Schnause . |
| 4,248,743 | 2/1981 | Goettler . |
| 4,248,820 | 2/1981 | Haataja . |
| 4,250,222 | 2/1981 | Mavel et al. . |
| 4,263,184 | 4/1981 | Leo et al. . |
| 4,273,688 | 6/1981 | Porzel et al. . |
| 4,277,428 | 7/1981 | Luck . |
| 4,281,039 | 7/1981 | Miura et al. . |
| 4,290,988 | 9/1981 | Nopper et al. . |
| 4,305,901 | 12/1981 | Prince et al. . |
| 4,311,554 | 1/1982 | Herr . |
| 4,311,621 | 1/1982 | Nishizawa et al. . |
| 4,323,625 | 4/1982 | Coran et al. . |
| 4,328,136 | 5/1982 | Blount . |
| 4,376,144 | 3/1983 | Goettler . |
| 4,382,108 | 5/1983 | Carroll et al. . |
| 4,393,020 | 7/1983 | Li et al. . |
| 4,414,267 | 11/1983 | Coran et al. . |
| 4,420,351 | 12/1983 | Lussi et al. . |
| 4,426,470 | 1/1984 | Wessling et al. . |
| 4,440,708 | 4/1984 | Haataja et al. . |
| 4,454,091 | 6/1984 | Chion et al. . |
| 4,455,709 | 6/1984 | Zanini . |
| 4,481,701 | 11/1984 | Hewitt . |
| 4,491,553 | 1/1985 | Yamada et al. . |
| 4,503,115 | 3/1985 | Hemels el al. . |
| 4,505,869 | 3/1985 | Nishibori ........................ 264/185 |
| 4,506,037 | 3/1985 | Suzuki et al. . |
| 4,508,595 | 4/1985 | Gåsland . |
| 4,551,294 | 11/1985 | Wottka et al. . |
| 4,562,218 | 12/1985 | Fornadel et al. . |
| 4,594,372 | 6/1986 | Natov et al. . |
| 4,597,928 | 7/1986 | Terentiev et al. . |
| 4,610,900 | 9/1986 | Nishiori . |
| 4,619,097 | 10/1986 | Trummer et al. . |
| 4,645,631 | 2/1987 | Hegenstaller et al. . |
| 4,659,754 | 4/1987 | Edwards et al. . |
| 4,663,225 | 5/1987 | Farley et al. . |
| 4,686,251 | 8/1987 | Ostermann et al. . |
| 4,687,793 | 8/1987 | Motegi et al. . |
| 4,716,062 | 12/1987 | Klein . |
| 4,734,236 | 3/1988 | Davis . |
| 4,737,532 | 4/1988 | Fujita et al. . |
| 4,769,109 | 9/1988 | Tellvik et al. . |
| 4,769,274 | 9/1988 | Tellvik et al. . |
| 4,774,272 | 9/1988 | Lamphere et al. . |
| 4,790,966 | 12/1988 | Sandberg et al. . |
| 4,791,024 | 12/1988 | Clerici et al. . |
| 4,818,604 | 4/1989 | Tock . |
| 4,820,763 | 4/1989 | Yang . |
| 4,837,977 | 6/1989 | Mauro . |
| 4,851,458 | 7/1989 | Hopperdietzel . |
| 4,865,788 | 9/1989 | Davis . |
| 4,889,673 | 12/1989 | Takimoto . |
| 4,894,192 | 1/1990 | Warych . |
| 4,915,764 | 4/1990 | Miani . |
| 4,927,579 | 5/1990 | Moore . |
| 4,929,409 | 5/1990 | Agren et al. . |
| 4,935,182 | 6/1990 | Ehner et al. . |
| 4,946,635 | 8/1990 | Steininger . |
| 4,957,809 | 9/1990 | Davis . |
| 4,960,548 | 10/1990 | Ikeda et al. . |
| 4,968,463 | 11/1990 | Levasseur . |
| 4,973,440 | 11/1990 | Tamura et al. . |
| 4,978,489 | 12/1990 | Radvan et al. . |
| 4,978,575 | 12/1990 | Ziess . |
| 4,988,478 | 1/1991 | Held . |
| 5,002,713 | 3/1991 | Palardy et al. . |
| 5,008,310 | 4/1991 | Beshay . |
| 5,009,586 | 4/1991 | Pallmann . |
| 5,020,915 | 6/1991 | Julien . |
| 5,021,490 | 6/1991 | Vyvoda et al. . |
| 5,028,266 | 7/1991 | Rettenmaier . |
| 5,049,334 | 9/1991 | Bach . |
| 5,057,167 | 10/1991 | Gersbeck . |
| 5,075,057 | 12/1991 | Hoedl . |
| 5,075,359 | 12/1991 | Castagna et al. . |
| 5,078,937 | 1/1992 | Eela . |
| 5,082,605 | 1/1992 | Brooks et al. . |
| 5,084,135 | 1/1992 | Brooks et al. . |
| 5,087,400 | 2/1992 | Theuveny . |
| 5,088,910 | 2/1992 | Goforth et al. . |
| 5,093,058 | 3/1992 | Harmon et al. . |
| 5,096,046 | 3/1992 | Goforth et al. . |
| 5,096,406 | 3/1992 | Brooks et al. . |
| 5,100,545 | 3/1992 | Brooks . |
| 5,120,776 | 6/1992 | Raj et al. . |
| 5,183,837 | 2/1993 | Lepori et al. . |
| 5,284,710 | 2/1994 | Hartley et al. . |
| 5,322,899 | 6/1994 | Grunewalder et al. . |
| 5,486,553 | 1/1996 | Deaner et al. . |
| 5,539,027 | 7/1996 | Deaner et al. . |
| 5,695,874 | 12/1997 | Deaner et al. .................... 428/326 |

OTHER PUBLICATIONS

Dalvag, H. et al., "The efficiency of cellulosic fillers in common thermopoastics. Part II. Filling with processing aids and coupling agents", *Intern. J. Polymeric Mater.*, 11:9–38 (1985).

"Exchangeable Blade Mixers", C. W. Brabender, 2 pages (date unknown).

Hawley's Condensed Chemical Dictionary, Twelfth Edition (1990), pp. 923, 941, 943–944.

Holl, M., "Organische Verstärkungsfasern für Kunststoffe (Organic Reinforcement Fibres for Plastics)", *Kunststoff German Plastics*, vol. 80 (1990); 3 pages, with 4 pages of English translation.

Kokta, B.V. et al., "Composites of polyvinyl chloride–wood fibers. I. Effect of isocyanate as a bonding agent", *Polym.–Plast. Technol. Eng.*, 29(1&2):87–118 (1990).

Kokta, B.V. et al., "Composites of poly(vinyl chloride) and wood fibers. Part II: Effect of chemical treatment", *Polymer Composites* 11(2):84–89 (Apr. 1990).

Kokta, B.V. et al., "Composites of polyvinyl chloride–wood fibers. III: Effect of silane as coupling agent", *Journal of Vinyl Technology*, 12(3):146–153 (Sep. 1990).

Kokta, B. V. et al., "Use of grafted wood fibers in thermoplastic composites v. polystyrene", pp. 85–96 (source and date unknown).

Kokta, B. V., et al., "Use of wood fibers in thermoplastic composites", *Polymer Composites*, 4(4):229–232 (Oct. 1983).

Klason, C. et al., "The efficiency of cellulosic fillers in common thermoplastics. Part 1. Filling without processing aids or coupling agents", *Intern. J. Polymeric Mater.*, 10:159–187 (1984).

Möller GmbH & Co. KG brochure: "Mṗller Lignodur innenfensterbänke–Grosshandels–Preisliste", 7 pages (date unknown).

Owens, D. K., et al., "Estimation of the surface free energy of polymers", *Journal of Applied Polymer Science*, 13:1741–1747 (1969).

Primo Sverige AB brochure, "Sonwood® Interior Profiles", 8 pgs (1993).

Raj, R. G. et al., "Use of wood fiber as filler in common thermoplastics: Studies on mechanical properties", *Science and Engineering of Composite Materials*, 1(3):85–98 (1989).

Raj, R. G. et al., "Use of wood fibers in thermoplastics. VII. The effect of coupling agents in polyethylene–wood fiber composites", *Journal of Applied Polymer Science*, 37:1089–1103 (1989).

Rogalski, M.E. et al., "Poly(vinyl–chloride) wood fiber composites", *Antec '87*, pp. 1436–1440 (1987).

"Träfylld plast enligt ny metod (Wood–filled plastic by a new method)", *Plastvärlden (World of Plastics)*, 1 pg, with 2–page English translation (Apr. 1974).

Wegman, R. F., "Surface preparation techniques for adhesive bonding", *Noyes Publications* (1989; 2 pgs.).

Woodhams, R. T., et al., "Wood fibers as reinforcing fillers for polyolefins", *Polymer Engineering and Science*, 24(15):1166–1171 (Oct. 1984).

Yam, K. L., "Composites from compounding wood fibers with recycled high density polyethylene", *Polymer Engineering and Science*, 30(11):693–699 (mid–Jun. 1990).

Zadorecki, P., "Future prospects for wood cellulose as reinforcement in organic polymer composites", *Polymer Composites*, 10(2):69–77 (Apr. 1989).

Database WPI, Week 8442, Derwent Publications Ltd., London, GB; AN 84–259377 & JP–A–59 156 172 (Ain Eng.), Sep. 6, 1984.

Database WPI, Week 8402, Derwent Publications Ltd., London, GB; AN 84–008707 & JP–A–58 204 049 (Ein Eng.), Nov. 28, 1983.

Database WPI, Week 84721 Derwent Publications Ltd., London, GB; AN 87–147663 & JP–A–61 086 042 (Chisso), Apr. 20, 1987.

Database WPI, Week 8652, Derwent Publications Ltd., London, GB; AN 86–341745 & JP–A–61 236 858 (Chisso), Oct. 22, 1986.

"Composites of Polyvinyl Chloride–Wood Fibers: IV. Effect of the Nature of Fibers"; Journal of Vinyl Tech, Jun. 1989, vol. 11, Maldas et al. pp. 90–98.

CA: 118: 193873 Sean et al., 1992.

ADVANCED ENGINEERING RESIN AND WOOD FIBER COMPOSITE

FIELD OF THE INVENTION

This invention relates to composite thermoplastic materials used for the fabrication of structural members. Such members can comprise any structural unit or portion thereof. Preferably the member can be used in the manufacture of windows or doors for residential and commercial architecture. These composite materials can include an optional, intentional recycle of by-product streams derived from window and door manufacture, including thermoplastic resin, adhesive, paint, etc. More particularly, the invention relates to an improved composite material adapted to extrusion or injection molding processes, an formed into structural members that have improved properties when used in windows and doors. The composite materials of the invention can be made to manufacture structural components such as rails, jambs, stiles, sills, tracks, stop and sash, nonstructural trim elements such as grid, cove, bead, quarter round, etc.

BACKGROUND OF THE INVENTION

Conventional window and door manufacturers have commonly used wood and metal components in forming structural members. Commonly, residential windows are manufactured from milled wood products or extruded aluminum parts that are assembled with glass to form typically double hung or casement units. Wood windows while structurally sound, useful and well adapted for use in many residential installations, can deteriorate under certain circumstances. Wood windows also require painting and other periodic maintenance. Wooden windows also suffer from cost problems related to the availability of suitable wood for construction. Clear wood products are slowly becoming more scarce and are becoming more expensive as demand increases. Metal components are often combined with glass and formed into single unit sliding windows. Metal windows typically suffer from substantial energy loss during winter months.

Extruded thermoplastic materials have also been used as non-structural components in window and door manufacture. Filled and unfilled thermoplastics have been extruded into useful seals, trim, weatherstripping, coatings and other window construction components. Thermoplastic materials such as polyvinyl chloride have been combined with wood members in manufacturing PERMASHIELD® brand windows manufactured by Andersen Corporation for many years. The technology disclosed in Zanini, U.S. Pat. Nos. 2,926,729 and 3,432,883, have been utilized in the manufacturing of plastic coatings or envelopes on wooden or other structural members. Generally, the cladding or coating technology used in making PERMASHIELD® windows involves extruding a thin polyvinyl chloride coating or envelope surrounding a wooden structural member.

Polyvinyl chloride has been combined with wood to make extruded materials. Such materials have successfully been used in the form of a structural member that is a direct replacement for wood. These extruded materials have sufficient modulus, compressive strength, coefficient of thermal expansion to match wood to produce a direct replacement material. Typical composite materials have achieved a modulus greater than about 500,000 psi acceptable COTE, tensile strength, compressive strength, etc. to be useful. Deaner et al., U.S. Pat. Nos. 5,406,768 and 5,441,801, U.S. Ser. Nos. 08/224,396 abandoned in favor of 08/326,481 which was abandoned in favor of 08/587,828 which is now pending; U.S. patent application Ser. No. 08/326,480 now pending; as well as U.S. patent application Ser. No. 08/224,399 now issued U.S. Pat. No. 5,486,553; U.S. patent application Ser. No. 08/326,472 now U.S. Pat. No. 5,539,027; U.S. patent application Ser. No. 08/326,479 now U.S. Pat. No. 5,497,594; and U.S. patent application Ser. No. 08/372,101 which has issued as U.S. Pat. No. 5,518,677 disclose a PVC/wood fiber composite that can be used as a high strength material in a structural member. This PVC/fiber composite has utility in many window and door applications.

A substantial and continuing need exists to provide a improved composite material (using polymers having no chloride containing monomer components) that can be made of thermoplastic polymer and wood fiber. The composite can be made with an optional, intentional recycle of a waste stream. A further need exists for a composite material that can be extruded into a shape that is a direct substitute for the equivalent milled shape in a wooden or metal structural member. A thermoplastic with fiber compatibility, good thermal properties and good structural or mechanical properties is required. This need also requires a composite with a coefficient of thermal expansion that approximates wood, that can be extruded into reproducible stable dimensions, a high modulus, a high tensile strength, a high compressive strength, a low thermal transmission rate, an improved resistance to insect attack and rot while in use and a hardness and rigidity that permits sawing, milling, and fastening retention comparable to wood members. Further, companies manufacturing window and door products have become significantly sensitive to waste streams produced in the manufacture of such products. Substantial quantities of wood waste including wood trim pieces, sawdust, wood milling by-products, recycled thermoplastic materials, has caused significant expense to window manufacturers. Commonly, these materials are either burned for their heat value in electrical generation or are shipped to qualified landfills for disposal. Such waste streams are contaminated with substantial proportions of hot melt and solvent-based adhesives, waste thermoplastic, paint, preservatives, and other organic materials. A substantial need exists to find a productive environmentally compatible use for such waste streams to avoid returning the materials into the environment in an environmentally harmful way. A composite that can be made with properties of these streams can be an advantage.

BRIEF DISCUSSION OF THE INVENTION

We have found that the problems relating to forming a substitute for wood and metal structural members and the problems relating to the recycle of waste streams in window manufacture can be solved by forming an engineering resin/wood fiber composite material into window and door structural members. A large variety of engineering resins have been provided over the last few years. These resins are available in a variety of grades, molecular weights, melting points, formulations, containing materials of great variability. We have found that not every engineering resin thermoplastic is useful in the manufacture of wood fiber composites. The engineering resin must be compatible in the melt form with wood fiber to form a high strength composite. The wood fiber must be fully wetted and penetrated, in its cellular structure, with the thermoplastic to form a high strength composite material. Further, the engineering resin must have thermal properties (melt flow properties or m.p<240° C.) that permit successful composite manufacture. Lastly, the resin should provide sufficient structural properties to the composite material to be successful in structural members in window and door manufacture. The engineering resin can be combined with wood fiber and optional waste materials to form a resin/wood fiber composite, preferably in the form of a pellet. The wood fiber comprises the sawdust or milling byproduct waste stream from milling wooden members in window manufacture and can be contaminated with substantial proportions of hot melt adhesive, paint, solvent or adhesive components, preservatives, resin, pigment, plasticizers, etc. We have found that the resin and wood fiber composite can be manufactured into acceptable substitutes for wooden members if the resin and wood material contains less than about 10 wt %, preferably less than 3.5% water based on pellet weight. The compositions can achieve in a final product high modulus, high compressive strength, reproducible, stable dimensions, a superior modulus of elasticity and a coefficient of thermal expansion that matches wooden members.

We have also found that the successful manufacture of structural members for windows and doors requires the preliminary manufacture of the resin\wood fiber composite in the form of a pellet wherein the materials are intimately mixed and contacted in forming the pellet prior to the extrusion of the members from an appropriately shaped die using the composite or pellet material. We have found that the intimate mixing of the resin, wood fiber, and optional waste in the manufacture of the composite or pellet with associated control of moisture content produces a pelletized product that is uniquely adapted to the extrusion manufacture of resin/wood fiber components and achieves the manufacture of a useful wood replacement product.

DETAILED DESCRIPTION OF THE INVENTION

The invention relates to the use of an engineering resin and wood fiber composite materials with a controlled water content in the form of a composite or pelletized material wherein the wood fiber is intimately contacted and wetted by the resin and organic materials. The intimate contact and wetting between the components in the pelletizing process ensures high quality physical properties in the extruded composite materials after manufacture.

Pellet

The engineering resin and wood fiber can be combined and formed into a pellet using a thermoplastic extrusion processes. Initial pellet formation is an important step in composite manufacture. Wood fiber can be introduced into pellet making process in a number of sizes. We believe that the wood fiber should have a minimum length of at least about 0.1 mm because wood flour (having a smaller dimension) tends to be explosive at certain wood to air ratios. Further, wood fiber of appropriate size of a aspect ratio greater than about 1.5 tends to increase the physical properties of the extruded structural member.

During the pelletizing process for the composite pellet, the resin and wood fiber are intimately contacted at high temperatures and pressures to insure that the wood fiber and polymeric material are wetted, mixed and extruded in a form such that the polymer material, on a microscopic basis, coats and flows into the pores, cavity, etc., of the fibers. The fibers are preferably substantially oriented by the extrusion process in the extrusion direction. Such substantial orientation causes overlapping of adjacent parallel fibers and polymeric coating of the oriented fibers resulting a material useful for manufacture of improved structural members with improved physical properties. The degree of orientation is about 20%, preferably 30% above random orientation which is about 45 to 50%. The structural members have substantially increased strength and tensile modulus with a coefficient of thermal expansion and a modulus of elasticity that is optimized for window and doors. The properties are a useful compromise between wood, aluminum and neat polymer.

Moisture control is an important element of manufacturing a useful linear extrudate or pellet. Depending on the equipment used and processing conditions, control of the water content of the linear extrudate or pellet can be important in forming a successful structural member substantially free of internal voids or surface blemishes. The concentration of water present in the sawdust during the formation of pellet or linear extrudate when heated can flash from the surface of the newly extruded structural member and can come as a result of a rapid volatilization, form a steam bubble deep in the interior of the extruded member which can pass from the interior through the hot thermoplastic extrudate leaving a substantial flaw. In a similar fashion, surface water can bubble and leave cracks, bubbles or other surface flaws in the extruded member. Further, engineering resins that are moisture sensitive should be avoided. Water can react with some condensation polymers resulting in increased MI and reduced MW.

Trees when cut depending on relative humidity and season can contain from 30 to 300 wt % water based on fiber content. After rough cutting and finishing into sized lumber, seasoned wood can have a water content of from 20 to 30 wt % based on fiber content. Kiln dried sized lumber cut to length can have a water content typically in the range of 8 to 12%, commonly 8 to 10 wt % based on fiber. Some wood source, such as poplar or aspen, can have increased moisture content while some hard woods can have reduced water content.

Because of the variation in water content of wood fiber source and the sensitivity of extrudate to water content control of water to a level of less than 8 wt % in the pellet based on pellet weight is important. Structural members extruded in non-vented extrusion process, the pellet should be as dry as possible and have a water content between about 0.01 and 7%, preferably 0.01 and 5% more, preferably less than 1.5 wt %. When using vented equipment in manufacturing the extruded linear member, a water content of less than 8 wt % can be tolerated if processing conditions are such that vented extrusion equipment can dry the thermoplastic material prior to the final formation of the structural member of the extrusion head.

The pellets or linear extrudate of the invention are made by extrusion of the engineering resin and wood fiber composite through an extrusion die resulting in a linear extrudate that can be cut into a pellet shape. The pellet cross-section can be any arbitrary shape depending on the extrusion die geometry. However, we have found that a regular geometric cross-sectional shape can be useful. Such regular cross-sectional shapes include a triangle, a square, a rectangle, a hexagonal, an oval, a circle, etc. The preferred shape of the pellet is a regular cylinder having a roughly circular or somewhat oval cross-section. The pellet volume is preferably greater than about 12 mm$^3$. The preferred pellet is a right circular cylinder, the preferred radius of the cylinder is at least 1.5 mm with a length of at least 1 mm. Preferably, the pellet has a radius of 0.5 to 5 mm and a length of 1 to 50 mm. Most preferably, the cylinder has a radius of 1.5 to 2.5 mm, a length of 1.5 to 4.7 mm, a volume greater than 40 mm$^2$, preferably greater than 100 mm$^3$, a weight of 40 to 130 mg and a bulk density of about 0.2 to 0.8 gm/mm$^3$.

We have found that the interaction, on a microscopic level, between the resin mass and the wood fiber is an important element of the invention. The physical properties of an extruded member are improved when the polymer melt during extrusion of the pellet or linear member thoroughly wets and penetrates the wood fiber particles. The thermoplastic material comprises an exterior continuous organic resin phase with the wood particle dispersed as a discontinuous phase in the continuous resin phase. The fiber material during mixing and extrusion obtains or retains an aspect ratio of at least 1.5 and preferably between 2 and 7, optimizes orientation such as at least 20 wt %, preferably 30% of the fibers are oriented in an extruder direction and are thoroughly mixed and wetted by the polymer such that all exterior surfaces of the wood fiber are in contact with the polymer material. This means, that any pore, crevice, crack, passage way, indentation, etc., is fully filled by thermoplastic material. Such penetration as attained by ensuring that the viscosity of the resin melt is reduced by operations at elevated temperature and the use of sufficient pressure to force the polymer into the available internal pores, cracks and crevices in and on the surface of the wood fiber.

During the pellet or linear extrudate manufacture, substantial work is done in providing a uniform dispersion of the wood into the polymer material. Such work produces substantial orientation which when extruded into a final structural member, permits the orientation of the fibers in the structural member to be increased in the extruder direction resulting in improved structural properties.

The pellet dimensions are selected for both convenience in manufacturing and in optimizing the final properties of the extruded materials. A pellet is with dimensions substantially less than the dimensions set forth above are difficult to extrude, pelletize and handle in storage. Pellets larger than the range recited are difficult to introduce into extrusion or injection molding equipment, and are different to melt and form into a finished structural member.

Engineering Resin Thermoplastic Polymer, Copolymers and Polymeric Alloys

A large variety of engineering resins can be used in the pellet and the composite materials of the invention. For the purpose of this application, an engineering resin is a general term covering a thermoplastic that may or may not contain a filler or reinforcing material that have mechanical, chemical and thermal properties suitable for use as structural components, machine components and chemical processing equipment components. We have found that the engineering resins useful in the invention include both condensation polymeric materials and vinyl polymeric materials. Included are both vinyl and condensation polymer resins, and alloys thereof, such as acrylonitrile-butadiene-styrene (ABS), polyacetyl resins, polyacrylic resins, fluorocarbon resins, nylon, phenoxy resins, polybutylene resins, polyarylether such as polyphenylether, polyphenylsulfide materials; polycarbonate materials, chlorinated polyether resins, polyethersulfone resins, polyphenylene oxide resins, polysulfone resins, polyimide resins, thermoplastic urethane elastomers and many other resin materials. Vinyl polymers are typically manufactured by the polymerization of monomers having an ethylenically unsaturated olefinic group. Condensation polymer resins are typically prepared by a condensation polymerization reaction which is typically considered to be a stepwise chemical reaction in which two or more molecules combined, often but not necessarily accompanied by the separation of water or some other simple typically volatile substance. If a polymer is formed, the process is called polycondensation.

Important Polymer Characteristics

Not every engineering resin is useful in the wood fiber composite materials that we had mentioned. First the engineering resin must have a surface energy such that the material is compatible with the wood fiber. Resins that are not compatible with the wood fiber will not sufficiently wet the wood fiber to intimately bond and penetrate the wood fiber to obtain sufficient engineering properties. For the purpose of this invention, surface energy or surface wettability is defined in ASTMD 724-89 as revised and explained in the paper Owens et al. "Estimation of the Surface Free Energy of Polymers," *Journal of Applied Polymers Science,* Vol. 13 pp. 1741–1747 (1969). This method has become a standard method for quantifying surface energy. We have found that a useful surface energy is greater than about 40 dynes per centimeter. Further, we have found that the engineering resin must have sufficient viscosity at processing temperatures substantially less than the decomposition temperature of wood fiber. Accordingly, the processing temperature of the thermoplastic material must be substantially less than about 450° F. (340° C.) preferably between 180 and 240° C. Further, we have found that the engineering resin used in the composite of the invention must have little or no moisture sensitivity. In other words, when processed at thermoplastic temperatures, the resin as a result of instability in the presence of moisture, does not substantially change its molecular weight or melt index. A substantial change in molecular weight or melt index is a 50% reduction in molecular weight or a doubling in melt index. Lastly, after the thermoplastic material is manufactured by combining the thermoplastic engineering resin and the wood fiber, the resulting composite has a modulus greater than about 500,000 psi, preferably at least 600,000 psi. Further, the composite material should have a two hour water absorption ASTM D-57-81 less than 2%, more preferably less than 1% most preferably less than 0.6%.

| ENGINEERING RESIN THERMOPLASTIC PARAMETERS | | |
|---|---|---|
| | USEFUL | PREFERRED |
| PROCESS TEMPERATURE | T <250° C. | 150°–240° C. |
| MOISTURE SENSITIVITY | Less than 4x increase in MI | Less than 2x increase in MI |
| SURFACE ENERGY | E >40 dynes/cm | E >45 dynes/cm |
| MODULUS* (RESIN) | >200,000 | >300,000 |

*FLEX

Condensation Polymer Resins

Condensation polymer resins that can be used in the composite materials of the invention include polyamides, polyamide-imide polymers, polyarylsulfones, polycarbonate, polybutylene terephthalate, polybutylene naphthalate, polyetherimides, polyethersulfones, polyethylene terephthalate, thermoplastic polyimides, polyphenylene ether blends, polyphenylene sulfide, polysulfones, thermoplastic polyurethanes and others. Preferred condensation engineering resins include polycarbonate materials, polyphenyleneoxide materials, and polyester materials including polyethylene terephthalate, polybutylene terephthalate, polyethylene naphthalate and polybutylene naphthalate materials. Generally useful condensation polymers have a melt flow index of about 1 to 10 gm/10 min.

Polycarbonate engineering resins are high performance, amorphous engineering thermoplastics having high impact strength, clarity, heat resistance and dimensional stability. Polycarbonates are generally classified as a polyester or carbonic acid with organic hydroxy compounds. The most common polycarbonates are based on phenol A as a hydroxy compound copolymerized with carbonic acid. Materials are often made by the reaction of a bisphenol A with phosgene ($COCl_2$). Polycarbonates can be made with phthalate monomers introduced into the polymerization extruder to improve properties such as heat resistance, further trifunctional materials can also be used to increase melt strength or extrusion blow molded materials. Polycarbonates can often be used as a versatile blending material as a component with other commercial polymers in the manufacture of alloys. Polycarbonates can be combined with polyethylene terephthalate acrylonitrile-butadiene-styrene resins, styrene maleic anhydride resins and others. Preferred alloys comprise a styrene copolymer and a polycarbonate. Preferred melt for the polycarbonate materials should be indices between 0.5 and 7, preferably between 1 and 5 gms/10 min.

A variety of polyester condensation polymer materials including polyethylene terephthalate, polybutylene terephthalate, polyethylene naphthalate, polybutylene naphthalate, etc. can be useful in the engineering resin wood fiber thermoplastic composites of the invention. Polyethylene terephthalate and polybutylene terephthalate are high performance condensation polymer materials. Such polymers often made by a copolymerization between a diol (ethylene glycol, 1,4-butane diol) with dimethyl terephthalate. In the polymerization of the material, the polymerization mixture is heated to high temperature resulting in the transesterification reaction releasing methanol and resulting in the formation of the engineering plastic. Similarly, polyethylene naphthalate and polybutylene naphthalate materials can be made by copolymerizing as above using as an acid source, a naphthalene dicarboxylic acid. The naphthalate thermoplastics have a higher $T_g$ and higher stability at high temperature compared to the terephthalate materials. However, all these polyester materials are useful in the composite structural materials of the invention. Such materials have a preferred molecular weight characterized by melt flow properties. Useful polyester materials have a viscosity at 265° C. of about 500–2000 cp, preferably about 800–1300 cP.

Polyphenylene oxide materials are engineering thermoplastics that are useful at temperature ranges as high as 330° C. Polyphenylene oxide has excellent mechanical properties, dimensional stability, and dielectric characteristics. Commonly, phenylene oxides are manufactured and sold as polymer alloys or blends when combined with other polymers or fiber. Polyphenylene oxide typically comprises a homopolymer of 2,6-dimethyl-1-phenol. The polymer commonly known as poly(oxy-(2,6-dimethyl-1,4-phenylene)). Polyphenylene is often used as an alloy or blend with a polyamide, typically nylon 6—6, alloys with polystyrene or high impact styrene and others. A preferred melt index (ASTM 1238) for the polyphenylene oxide material useful in the invention typically ranges from about 1 to 20, preferably about 5 to 10 gm/10 min. The melt viscosity is about 1000 at 265° C.

Vinyl Polymers

A large variety of vinyl polymeric materials can be used in the composite materials can be used in the composite materials of the invention.

However, a preferred class of thermoplastic include styrenic copolymers. The term styrenic copolymer indicates that styrene is copolymerized with a second vinyl monomer resulting in a vinyl polymer. Such materials contain at least a 5 mol % styrene and the balance being 1 or more other vinyl monomers. An important class of these materials are styrene acrylonitrile (SAN) polymers. SAN polymers are random amorphous linear copolymers produced by copolymerizing styrene acrylonitrile and optionally other monomers. Emulsion, suspension and continuous mass polymerization techniques have been used. SAN copolymers possess transparency, excellent thermal properties, good chemical resistance and hardness. These polymers are also characterized by their rigidity, dimensional stability and load bearing capability. Olefin modified SAN's (OSA polymer materials) and acrylic styrene acrylonitriles (ASA polymer materials) are known. These materials are somewhat softer than unmodified SAN's and are ductile, opaque, two phased terpolymers that have surprisingly improved weatherability.

ASA resins are random amorphous terpolymers produced either by mass copolymerization or by graft copolymerization. In mass copolymerization, an acrylic monomer styrene and acrylonitrile are combined to form a heteric terpolymer. In an alternative preparation technique, styrene acrylonitrile oligomers and monomers can be grafted to an acrylic elastomer backbone. Such materials are characterized as outdoor weatherable and UV resistant products that provide excellent accommodation of color stability property retention and property stability with exterior exposure. These materials can also be blended or alloyed with a variety of other polymers including polyvinyl chloride, polycarbonate, polymethyl methacrylate and others. An important class of styrene copolymers includes the acrylonitrile-butadiene-styrene monomers. These resins are very versatile family of engineering thermoplastics produced by copolymerizing the three monomers. Each monomer provides an important property to the final terpolymer material. The final material has excellent heat resistance, chemical resistance and surface hardness combined with processability, rigidity and strength. The polymers are also tough and impact resistant. The styrene copolymer family of resins have a melt index that ranges from about 0.5 to 25, preferably about 0.5 to 20.

An important class of engineering resins that can be used in the composites of the invention include acrylic resins. Acrylics comprise a broad array of polymers and copolymers in which the major monomeric constituents are an ester acrylate or methacrylate. These resins are often provided in the form of hard, clear sheet or pellets. Acrylic monomers polymerized by free radical processes initiated by typically peroxides, azo compounds or radiant energy. Commercial polymer formulations are often provided in which a variety of additives are modifiers used during the polymerization provide a specific set of properties for certain applications. Pellets made for resin grade applications are typically made either in bulk (continuous solution polymerization), followed by extrusion and pelleting or continuously by polyermization in an extruder in which unconverted monomer is removed under reduced pressure and recovered for recycling. Acrylic plastics are commonly made by using methyl acrylate, methylmethacrylate, higher alkyl acrylates and other copolymerizable vinyl monomers. Preferred acrylic resin materials useful in the composites of the invention has a melt index of about 0.5 to 50, preferably about 1 to 30 gm/10 min.

Vinyl polymer resins include a acrylonitrile; alpha-olefins such as ethylene, propylene, etc.; chlorinated monomers such as vinylidene dichloride, acrylate monomers such as acrylic acid, methylacrylate, methylmethacrylate, acrylamide, hydroxyethyl acrylate, and others; styrenic monomers such as styrene, alphamethyl styrene, vinyl toluene, etc.; vinyl acetate; and other commonly available ethylenically unsaturated monomer compositions. Preferred vinyl resin materials useful in the composites of the invention have a meltflow index of about 0.1 to 20 gm/10 min. One useful resin includes polyacetal resin materials having a meltflow index of about 0.001 to 0.1 gm/10 min.

Polymer blends or polymer alloys can be useful in manufacturing the pellet or linear extrudate of the invention. Such alloys typically comprise two miscible polymers blended to form a uniform composition. Scientific and commercial progress in the area of polymer blends has lead to the realization that important physical property improvements can be made not by developing new polymer material but by forming miscible polymer blends or alloys. A polymer alloy at equilibrium comprises a mixture of two amorphous polymers existing as a single phase of intimately mixed segments of the two macro molecular components. Miscible amorphous polymers form glasses upon sufficient cooling and a homogeneous or miscible polymer blend exhibits a single, composition dependent glass transition temperature ($T_g$). Immiscible or non-alloyed blend of polymers typically displays two or more glass transition temperatures associated with immiscible polymer phases. In the simplest cases, the properties of polymer alloys reflect a composition weighted average of properties possessed by the components. In general, however, the property dependence on composition varies in a complex way with a particular property, the nature of the components (glassy, rubbery or semi-crystalline), the thermodynamic state of the blend, and its mechanical state whether molecules and phases are oriented.

The primary requirement for the substantially thermoplastic engineering resin material is that it retain sufficient thermoplastic properties to permit melt blending with wood fiber, permit formation of linear extrudate pellets, and to permit the composition material or pellet to be extruded or injection molded in a thermoplastic process forming the rigid structural member. Engineering resin and resin alloys are available from a number of manufacturers including B.F. Goodrich, G.E., Dow, and duPont.

Wood Fiber

Wood fiber, in terms of abundance and suitability can be derived from either soft woods or evergreens or from hard woods commonly known as broad leaf deciduous trees. Soft woods are generally preferred for fiber manufacture because the resulting fibers are longer, contain high percentages of lignin and lower percentages of hemicellulose than hard woods. While soft wood is the primary source of fiber for the invention, additional fiber make-up can be derived from a number of secondary or fiber reclaim sources including bamboo, rice, sugar cane, and recycled fibers from newspapers, boxes, computer printouts, etc.

However, the primary source for wood fiber of this invention comprises the wood fiber by-product of sawing or milling soft woods commonly known as sawdust or milling tailings. Such wood fiber has a regular reproducible shape and aspect ratio. The fibers based on a random selection of about 100 fibers are commonly at least about 0.1 mm in length, up to about 1 mm in thickness and commonly have an aspect ratio of at least 1.5 preferably, at least about 1.8. Preferably, the fibers are about 0.1 to 5 mm in length with an aspect ratio between about 2 and 7, preferably about 2.5 to 6. Preferably, the pellet comprises a right circular cylinder having a radius of about 0.1 to 5 mm and a length of about 0.1 to 10 mm. The preferred fiber for use in this invention are fibers derived from processes common in the manufacture of windows and doors. Wooden members are commonly ripped or sawed to size in a cross grain direction to form appropriate lengths and widths of wood materials. The by-product of such sawing operations is a substantial quantity of sawdust. In shaping a regular shaped piece of wood into a useful milled shape, wood is commonly passed through machines which selectively removes wood from the piece leaving the useful shape. Such milling operations produces substantial quantities of sawdust or mill tailing by-products. Lastly, when shaped materials are cut to size and mitered joints, butt joints, overlapping joints, mortise and tenon joints are manufactured from pre-shaped wooden members, substantial waste trim is produced. Such large trim pieces are commonly cut and machined to convert the larger objects into wood fiber having dimensions approximating sawdust or mill tailing dimensions. The wood fiber sources of the invention can be blended regardless of particle size and used to make the composite. The fiber stream can be pre-sized to a preferred range or can be sized after blending. Further, the fiber can be pre-pelletized before use in composite manufacture.

Such sawdust material can contain substantial proportions of waste stream by-products. Such by-products include waste polyvinyl chloride or other polymer materials that have been used as coating, cladding or envelope on wooden members; recycled structural members made from thermoplastic materials; polymeric materials from coatings; adhesive components in the form of hot melt adhesives, solvent based adhesives, powdered adhesives, etc.; paints including water based paints, alkyd paints, epoxy paints, etc.; preservatives, anti-fungal agents, anti-bacterial agents, insecticides, etc., and other waste streams common in the manufacture of wooden doors and windows. The total waste stream content of the wood fiber materials is commonly less than 25 wt % of the total wood fiber input into the composite product. Of the total waste recycle, approximately 10 wt % of that can comprise a thermoplastic. Commonly, the intentional recycle ranges from about 1 to about 25 wt %, preferably about 2 to about 20 wt %, most commonly from about 3 to about 15 wt % of contaminants based on the sawdust.

| COMPOSITE PARAMETERS | | |
|---|---|---|
| | USEFUL | PREFERRED |
| MODULUS* | >500,000 | >700,0000 |
| TWO HOUR WATER ABSORPTION | <1.0% | |
| COEFFICIENT OF THERMAL EXPANSION | <2.5 × 10$^{-5}$ in/in-°F. | <1.5 × 10$^{-6}$ in/in-°F. |
| HEAT DISTRIBUTION TEMPERATURE | T >100° C. | T >105° C. |
| IMPACT ENERGY | >4 in-lb | >6 in-lb |

* FLEX

Composition and Pellet Manufacture

In the manufacture of the composition and pellet of the invention, the manufacture and procedure requires two important steps. A first blending step and a second pelletizing step.

During the blending step, the engineering resin and wood fiber are intimately mixed by high shear mixing components with recycled material to form a polymer wood composite wherein the polymer mixture comprises a continuous organic phase and the wood fiber with the recycled materials forms a discontinuous phase suspended or dispersed throughout the polymer phase. The manufacture of the dispersed fiber phase within a continuous polymer phase requires substantial mechanical input. Such input can be achieved using a variety of mixing means including preferably extruder mechanisms wherein the materials are mixed under conditions of high shear until the appropriate degree of wetting and intimate contact is achieved. After the materials are fully mixed, the moisture content can be controlled at a moisture removal station. The heated composite is exposed to atmospheric pressure or reduced pressure at elevated temperature for a sufficient period of time to remove moisture resulting in a final moisture content of about 8 wt % or less. Lastly, the polymer fiber is aligned and extruded into a useful form.

The preferred equipment for mixing and extruding the composition and wood pellet of the invention is an industrial extruder device. Such extruders can be obtained from a variety of manufacturers including Cincinnati Millicron, etc.

The materials feed to the extruder can comprise from about 30 to 50 wt % of sawdust including recycled impurity along with the balance an engineering resin composition. Preferably, about 35 to 50 wt % wood fiber or sawdust is combined with 65 to 50 wt % of resin. The resin feed is commonly in a small particulate size which can take the form of flake, pellet, powder, etc. Any polymer resin form can be used such that the polymer can be dry mixed with the sawdust to result in a substantially uniform pre-mix. The wood fiber or sawdust input can be derived from a number of plant locations including the sawdust resulting from rip or cross grain sawing, milling of wood products or the intentional commuting or fiber manufacture from waste wood scrap. Such materials can be used directly from the operations resulting in the wood fiber by-product or the by-products can be blended to form a blended product. Further, any wood fiber material alone, or in combination with other wood fiber materials, can be blended with waste stream by-product from the manufacturer of wood windows as discussed above. The wood fiber or sawdust can be combined with other fibers and recycled in commonly available particulate handling equipment.

Resin and wood fiber are then dry blended in appropriate proportions prior to introduction into blending equipment. Such blending steps can occur in separate powder handling equipment or the polymer fiber streams can be simultaneously introduced into the mixing station at appropriate feed ratios to ensure appropriate product composition.

In a preferred mode, the wood fiber is placed in a hopper, controlled by weight or by volume, to proportion fiber into the mixer. The resin is introduced into a similar resin input system. The amount of resin and fiber are adjusted to ensure that the composite material contains appropriate proportions on a weight or volume basis. The fibers are introduced into an extrusion device preferably a twin screw extrusion device. The extrusion device has a mixing section, a transport section and melt section. Each section has a desired heat profile resulting in a useful product. The materials are introduced into the extruder at a rate of about 600 to about 1000 pounds of material per hour and are initially heated to a temperature that can maintain an efficient melt flow of resin. A multistage device is used that profiles processing temperature to efficiently combine resin and fiber. The final stage of extrusion comprises a head section. The head sections can contain a circular distribution (6–8" diameter) of 10 to 500 or more, preferably 20 to 250 orifices having a cross-sectional shape leading to the production of a regular cylindrical pellet. As the material is extruded from the head it is cut with a double-ended knife blade at a rotational speed of about 100 to 400 rpm resulting in the desired pellet length.

The following examples were performed to further illustrate the invention that is explained in detail above. The following information illustrates the typical production conditions and compositions and the tensile modulus of a structural member made from the pellet. The following examples and data contain a best mode.

Sample Preparation

A laboratory scale twin screw Brabender extruder is used to prepare samples of engineering resin-sawdust composites. The following resins were used:

| Brand Name | Generic Name | MFR. gm/10 min.* | Visocsity, Poise |
|---|---|---|---|
| Norryl PPO N190X | Poly phenylene oxide | 5–10 | 1050 @ 265° C. |
| Valox PBT 357 | Poly butylene terephthalate | | 800–1300 @ 265° C. |
| Centrex ASA Monsanto 833 | Acrylonitrile styrene acrylate terpolymer | 0.8–5 | |
| ABS + PC Cycloloy 2950 | ABS terpolymer polycarbonate blend | 1–5 | |
| Lustran ABS Monsanto 633 | Acrylonitrile butadiene styrene terpolymer | 0.9–5 | |
| Tyrel SAN Dow 1000 | Styrene acrylonitrile | 3.5–20 (lb/10 min. | |
| | Polyacetal | 0.002–0.03 | |
| CAB Eastman | Cellulose acetate butyrate | Flow Temp 180° C., Melt Flow not reported | |
| Geon PVC | Polyvinyl chloride | 0.8–25 | |

*Melt index/melt flow rate as measured by ASTM 1238

These polymers are premixed with sawdust (40% by weight) in a dough mixer. To assist processability a lubricant, oxidized polyethylene AC 629A, is added at 1.5–2 phr (parts per hundred parts of resin). For example: 600 grams of polymer is mixed with 400 grams of sawdust and 9 grams of AC629A. The premixed polymer-sawdust is then fed into the lab extruder. The extruder is equipped with a slit die (1" width, 0.1" thick) and a take-off puller with an air knife for cooling.

The polymer-sawdust mixture is fed to the extruder with a volumetric feeder. The feed rate is adjusted to give a smooth flow of material. The extruder is run at the following conditions:

| PARAMETER | SETTING |
|---|---|
| Barrel Zone 1 Temperature | 150° C. |
| Barrel Zone 2 Temperature | 165° C. |
| Barrel Zone 2 Temperature | 180° C. |
| Adapter Temperature | 185° C. |
| Die Temperature | 180° C. |
| Screw Speed | 10–15 |
| Feeder setting | 15–20 |
| Air pressure for cooling | 20 Psi |

The temperatures, feed rates and the screw speeds are adjusted to accommodate the varying flow characteristics of different polymers. After extrusion, about 4 feet length of strips were saved for physical property testing.

Physical Property Testing

The following tests were conducted on the samples obtained from the extruded strips. The sample size for the respective physical property tests is given below as length, width and thickness in inches. Before any kind of testing all the samples were annealed in an oven at 90° C. for 30 minutes and left at room temperature for at least 12 hours.

---

Instron stress-strain curves at 0.05 in/min strain rate on 7 × 1 × 0.1 inch samples (ASTM D 3039 M)
Heat Distortion Temperature testing in a heated air chamber on 5 × 1 × 0.1 inch samples (ASTM D 648-82)
Coefficient of thermal expansion using a Dilatometer on 2.5 × 0.5 × 0.1 inch samples (ASTM D 696-91)
Surface energy calculated from contact angles using Rame' Hart Goniometer

---

All the tests were conducted in close accordance with the ASTM standards listed above. Instron and Goniometer were operated at room temperature. Owing to the sensitivity of sawdust with the oil used as heat transfer fluid in a standard heat distortion measuring device, an insulated box with a strip heater and a temperature controller was built so that the samples could be heated with hot air. The ramp rate of temperature as measured by a thermocouple near the samples was around 1.85° C./min, which is close to the ASTM standard of 2° C./min. The Coefficient of thermal expansion is measured on 2.5 inch long sample over a temperature rise from 0. to 45° C.

Addition of filler to a polymer enhances its stiffness and its resistance to deform and expand with temperature rise as illustrated by measurements of modulus, HDT and COE. The contact angle as measured on a Goniometer reflects the wettability of a surface by a polar (water) and a non-polar (methylene iodide) liquids. A surface energy term has been computed from the contact angles obtained by placing a drop of water and methylene iodide on the surface. A surface with zero contact angle has high surface energy and good wettability. Wood has a high surface energy and thermoplastics have lower surface energy. Lesser the difference in surface energy between the wood and plastic, better the thermodynamic adhesion between them. These criteria were used to evaluate the effects of addition of sawdust to thermoplastics.

TABLE I

PHYSICAL PROPERTIES

| Material | Modulus | Mean HDT | Impact, in-lb |
|---|---|---|---|
| Poly(phenylene oxide) (Norryl N190X-6E) | 638027 | 102.4 | 7.31 |
| Poly(butylene Terephthalate) (Valox 357-6E) | 491217 | 119.9 | 4.44 |
| Poly(acrylic-styrene-acrylonitrile) (Centrex ASA Monsanto 833) | 674402 | 105.2 | 5.66 |
| Alloy poly(acrylontrile-butadiene-styrene/Polycarbonate alloy (Cycoloy 2950-6E) | 973745 | 101.7 | 6.00 |
| Poly(acrylontrile-butadiene-styrene) Lustran Monsanto 633 | 614336 | 106.4 | 6.00 |
| Poly(styrene-acrylonitrile) Tyrel Dow 1000 | 588409 | 108.4 | 3.65 |
| Cellulose acetate butyrate | 715589 | | |
| Fibrex (PVC/wood fiber composition-Andersen) | 1115190 | 97.6 | 6.96 |

TABLE II

SAMPLE DIMENSIONS FOR TESTS

| | Length in | Width in | Thickness in | |
|---|---|---|---|---|
| Instron (Modulus) | 7 | 1 | 0.1 | at 0.05 in/min strain rate |
| HDT | 5 | 1 | 0.1 | at 264 psi or 0.44 lb |
| Impact | 2 | 1 | 0.1 | with 0.87 lb dart |
| COTE | 2–2.5 | 0.4–0.5 | 0.09–0.11 | Dilatometer between 0 to 45 C., ASTM D696 |

The above specification, examples and data provide a complete description of the manufacture and use of the composition of the invention. Since many embodiments of the invention can be made without departing from the spirit and scope of the invention, the invention resides in the claims hereinafter appended.

We claim:

1. A resin and fiber composite thermoplastic pellet, capable of formation into a structural member, which pellet comprises a thermoplastic extrudate having a width of about 0.1 to 5 millimeters and a length of about 0.1 to 10 millimeters, the thermoplastic extrudate consisting essentially of:
   (a) a continuous phase comprising a thermoplastic engineering resin, comprising repeating monomer units substantially free of vinyl chloride, the resin having a surface energy greater than 40 dynes/cm, a processing temperature less than 250° C., and a moisture sensitivity such that the resin does not have a substantial reduction in melt index or molecular weight during processing in the presence of water; and
   (b) an effective amount of wood fiber having a minimum dimension of about 0.1 millimeter and a minimum aspect ratio of about 1.5 to provide structural properties to the composite;
wherein the resin and wood fiber are mixed at elevated temperatures and pressure such that an intimate admixture is formed, the wood fibers are dispersed in the a continuous thermoplastic phase, the pellet is a recyclable thermoplastic and the composite has a Young's modulus of at least 500,000 psi.

2. The composite of claim 1 wherein the engineering resin comprises a condensation polymer.

3. The composite of claim 2 wherein the condensation polymer comprises a polyphenylene oxide.

4. The composite of claim 2 wherein the condensation polymer comprises a polybutylene terephthalate.

5. The composite of claim 2 wherein the condensation polymer comprises a polyethylene naphthalate.

6. The composite of claim 2 wherein the condensation polymer comprises cellulose acetate butyrate.

7. The composite of claim 2 wherein the condensation polymer has a melt flow index of about 1 to 10 gm/10 min.

8. The composite of claim 7 wherein the pellet comprises about 0.01 to 7% water.

9. The composite of claim 2 wherein the resin comprises a thermoplastic polyurethane.

10. The composite of claim 1 wherein the engineering resin comprises a vinyl polymer.

11. The composite of claim 10 wherein the vinyl polymer comprises a copolymer comprising styrene.

12. The composite of claim 11 wherein the copolymer comprises acrylonitride and styrene.

13. The composite of claim 11 wherein the copolymer comprises acrylonitrile, butadiene and styrene.

14. The composite of claim 10 wherein the vinyl polymer comprises an acrylic polymer having repeating units derived from a monomer selected from the group consisting of acrylic acid, methacrylic acid, methylacrylate, methylmethacrylate, acrylamide and mixtures thereof.

15. The composite of claim 10 wherein the vinyl polymer has a processing temperature less than 235° C. and a melt flow index of about 0.1 to 20 gm/10 min.

16. The composite of claim 10 wherein the polymer is a polyacetal with a melt flow of about 0.001 to 0.1 gm/10 min.

17. The composite of claim 1 wherein the wood fiber comprises a by-product of milling or sawing wooden members and the pellet comprises less than about 10 wt % water.

18. The composite of claim 1 wherein the composite additionally comprises an agent that promotes the compatibility of the engineering resin and the wood fiber.

19. The composite of claim 1 wherein the wood fiber has a fiber length of about 0.1 to 2 millimeters and an aspect ratio of about 2 to 7.

20. The composite of claim 1 wherein the pellet comprises a right circular cylinder having a radius of about 0.1 to 5 mm and a length of about 0.1 to 10 mm.

21. The composite of claim 1 wherein the polymer comprises an additive selected from a lubricant, an antioxidant, a pigment, a thermal stabilizer, or a mixture thereof.

22. The composite of claim 1 wherein the aspect ratio of said wood fiber is at least about 1.8.

23. The composite of claim 1 wherein the composite has a Young's modulus of at least 600,000 psi.

24. The composite of claim 1 wherein the composite has a Young's modulus of at least $1 \times 10^6$ psi.

25. The composite of claim 1 wherein the resin comprises a polyvinylidene fluoride.

26. The composite of claim 1 wherein the resin comprises a polymer alloy.

27. The composite of claim 26 wherein the polymer alloy comprises a polycarbonate resin and an acrylonitrile-butadiene-styrene resin.

28. A resin and fiber thermoplastic composite, capable of formation into a structural member, which composite comprises a thermoplastic engineering resin and fiber, the composite consisting essentially of:

(a) a continuous phase of a thermoplastic engineering resin, comprising repeating monomer units substantially free of vinyl chloride, the resin having a surface energy greater than 40 dynes/cm, a processing temperature less than 250° C., and a moisture sensitivity such that the resin does not have a substantial reduction in either melt index or molecular weight during processing in the presence of water; and (b) an effective amount of wood fiber having a minimum dimension of about 0.1 millimeter and a minimum aspect ratio of about 1.5 to provide structural properties to the composite;

wherein the resin and wood fiber are mixed at elevated temperatures and pressure such that an intimate admixture is formed, the wood fibers disperse throughout a continuous thermoplastic resin phase, the pellet is recyclable and the composite has a Young's modulus of at least 500,000 psi.

29. The composite of claim 28 wherein the engineering resin comprises a condensation polymer.

30. The composite of claim 29 wherein the condensation polymer comprises a polyphenylene oxide.

31. The composite of claim 29 wherein the condensation polymer comprises a polybutylene terephthalate.

32. The composite of claim 29 wherein the condensation polymer comprises a polyethylene naphthalate.

33. The composite of claim 29 wherein the condensation polymer comprises a cellulose acetate butyrate.

34. The composite of claim 29 wherein the condensation polymer has a melt flow index of about 1 to 10 gm/10 min.

35. The composite of claim 28 wherein the engineering resin comprises a vinyl polymer.

36. The composite of claim 35 wherein the vinyl polymer comprises a copolymer comprising styrene.

37. The composite of claim 36 wherein the copolymer comprises acrylonitrile and styrene.

38. The composite of claim 36 wherein the copolymer comprises acrylonitrile, butadiene and styrene.

39. The composite of claim 35 wherein the vinyl polymer has a processing temperature less than 236° C. and a melt flow index of about 0.1 to 20 gm/10 min.

40. The composite of claim 28 wherein the engineering resin comprises an acrylic polymer having repeating units derived from a monomer selected from the group consisting of acrylic acid, methacrylic acid, methylacrylate, methylmethacrylate, acrylamide and mixtures thereof.

41. The composite of claim 28 wherein the wood fiber comprises a by-product of milling or sawing wooden members and the pellet comprise less than about 10 wt % water.

42. The composite of claim 28 wherein the composite additionally comprises an agent that promotes the compatibility of the engineering resin and the wood fiber.

43. The composite of claim 28 wherein the wood fiber has a fiber length of about 0.1 to 2 millimeters and an aspect ratio of about 2 to 7.

44. The composite of claim 28 wherein the polymer is a polyacetal with a melt flow of about 0.001 to 0.1 gm/10 min.

45. The composite of claim 28 wherein the pellet comprises about 0.01 to 7% water.

46. The composite of claim 28 wherein the resin additionally comprises an additive selected from a lubricant, an antioxidant, a pigment, a thermal stabilizer, or a mixture thereof.

47. The composite of claim 28 wherein the aspect ratio of said wood fiber is at least about 1.8.

48. The composite of claim 28 wherein the composite has a Young's modulus of at least 600,000 psi.

49. The composite of claim 28 wherein the composite has a Young's modulus of at least $1 \times 10^6$ psi.

50. The composite of claim 28 wherein the resin comprises a polyvinylidene chloride.

51. The composite of claim 28 wherein the resin comprises a thermoplastic polyurethane.

* * * * *

UNITED STATES PATENT AND TRADEMARK OFFICE
CERTIFICATE OF CORRECTION

PATENT NO. : 5,948,524

DATED : SEPTEMBER 7, 1999

INVENTOR(S) : SEETHAMRAJU ET AL.

It is certified that error appears in the above-identified patent and that said Letters Patent is hereby corrected as shown below:

Col. 1, line 15: "an" should read --and--

Col. 6, line 35: insert --of about 0.01 to 7% water, preferably-- after the numeral "81"

Col. 7, line 43: "cP" should read --cp--

Col. 7, lines 64, 65: delete "can be used in the composite materials" after the word "materials"

Col. 10, line 49: insert --<0.5%-- after the numeral "<1.0%"

Signed and Sealed this

Twenty-ninth Day of May, 2001

NICHOLAS P. GODICI

*Attest:*

*Attesting Officer*  *Acting Director of the United States Patent and Trademark Office*